Jan. 19, 1937.　　J. E. WOODLAND ET AL　　2,068,255
SCALE
Filed Dec. 10, 1935　　2 Sheets-Sheet 1
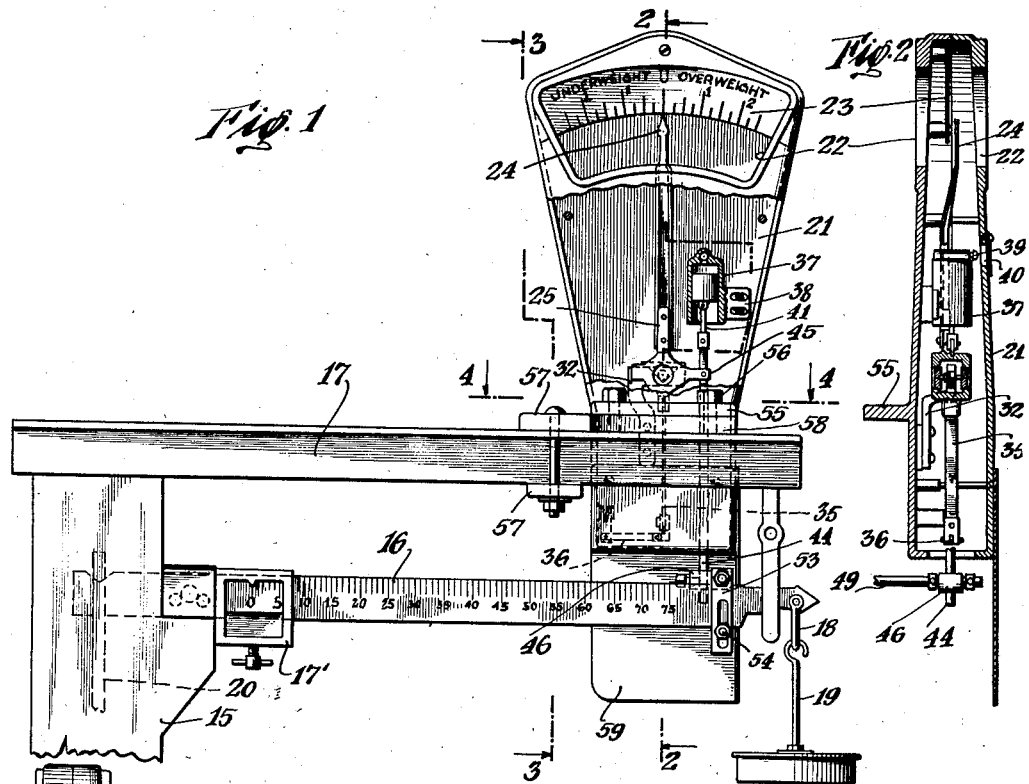
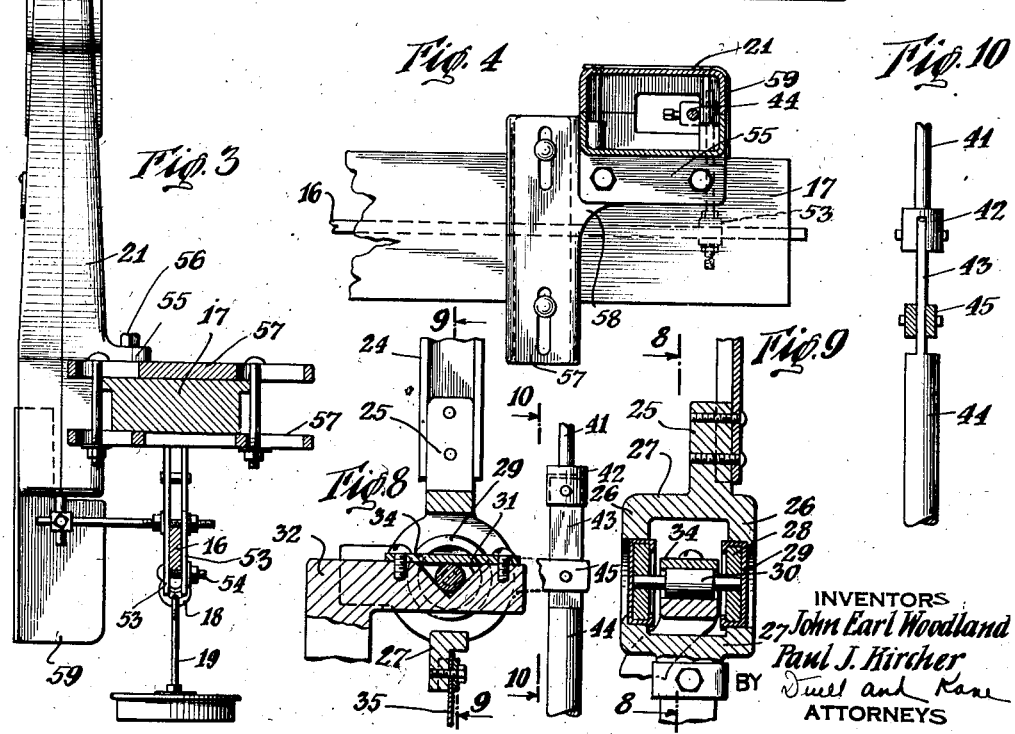
INVENTORS
John Earl Woodland
Paul J. Kircher
BY Duell and Kane
ATTORNEYS Jan. 19, 1937. J. E. WOODLAND ET AL 2,068,255
SCALE
Filed Dec. 10, 1935 2 Sheets-Sheet 2
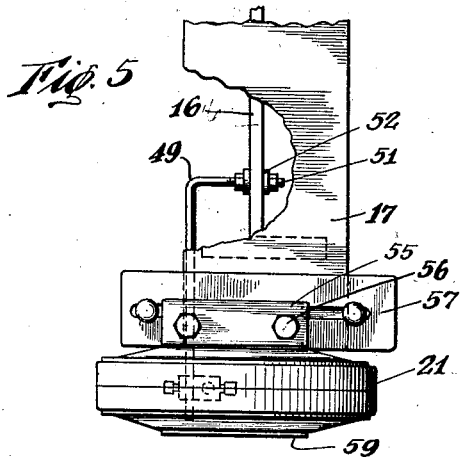
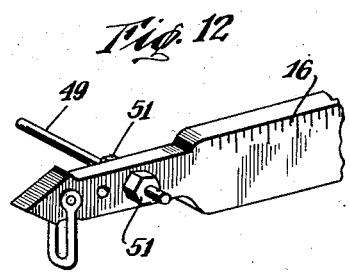
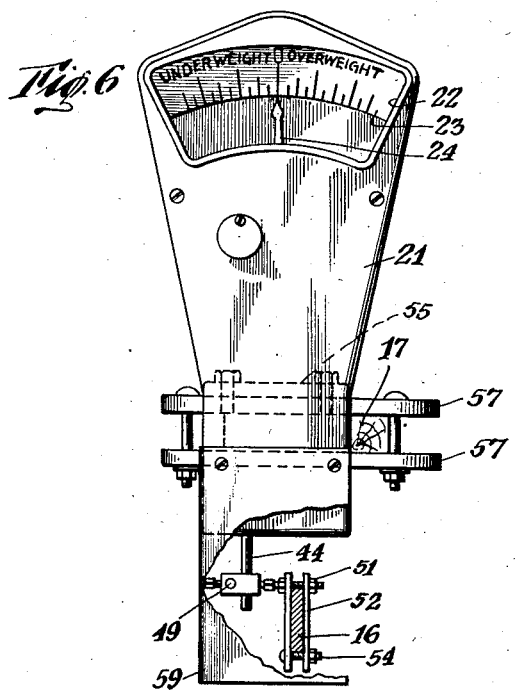
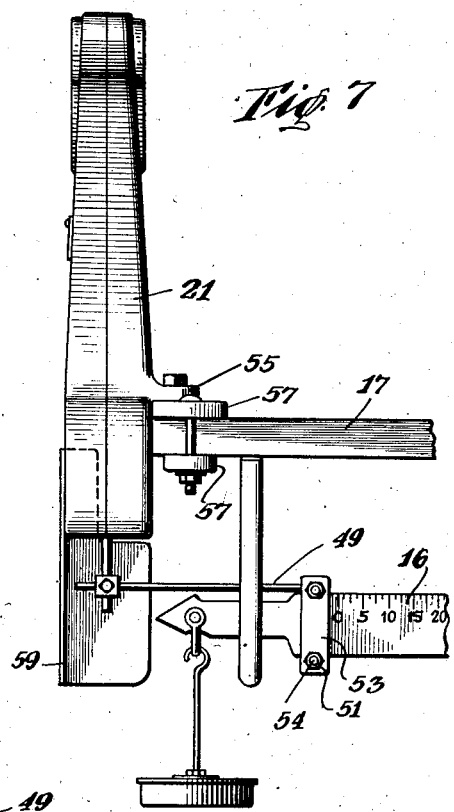
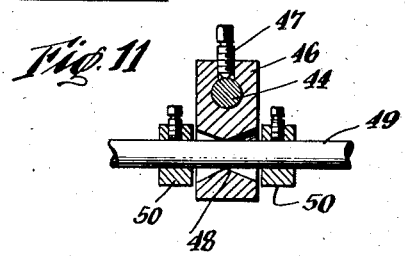
INVENTORS
John Earl Woodland
BY Paul J. Kircher
ATTORNEYS Patented Jan. 19, 1937

2,068,255

UNITED STATES PATENT OFFICE 2,068,255

SCALE

John E. Woodland, Columbus, Ohio, and Paul J. Kircher, Brooklyn, N. Y., assignors to The Jacobs Bros. Co., Inc., Brooklyn, N. Y., a corporation of New York Application December 10, 1935, Serial No. 53,720

4 Claims. (Cl. 265—58)

This invention relates to a "functionally and structurally" improved scale, and especially a scale of the beam or platform type.

In connection with the so-called platform scales, it is well appreciated that considerable difficulty has been experienced incident to bringing the beam to a stationary and "even balanced" condition. While in a single weighing operation this difficulty may not be of particular moment, it becomes a factor contributing materially to time and financial loss, if a succession of weighing operations have to be resorted to.

With this in mind the present invention aims to provide or, according to one of its aspects, an attachment for use in connection with the scales heretofore manufactured, and by means of which an operator will be able to rapidly bring the beam to a condition of even balance and to determine the weight value of the article resting upon the scale platform.

A further object of the invention is that of furnishing an improved mechanism of this nature, and by means of which it will be unnecessary for the operator to constantly adjust the poise weight of the scale in that the position of this member may be approximated, and any inaccuracy of its position—and consequent weight indication—may readily be compensated for.

A still further object is that of furnishing an improved mechanism which may be associated with a previously constructed platform or beam scale, and in which such association may occur at a number of optional points.

An additional object is that of furnishing a scale and attachment of this nature which will embody relatively few parts, each individually simple and rugged in construction, and capable of manufacture largely by automatic or semi-automatic machinery and methods; these parts being capable of ready assemblage to furnish a unitary apparatus operating over long periods of time and with freedom from difficulties.

With these and other objects in mind, reference is had to the attached sheets of drawings illustrating one practical embodiment of the invention, and in which Fig. 1 is a fragmentary view of the upper portion of a beam or platform scale and showing a register associated therewith in accordance with the teachings of this invention;

Fig. 2 is a transverse sectional view taken along the lines 2—2, and in the direction of the arrows as indicated in Fig. 1;

Fig. 3 is a view taken along the lines 3—3 and in the direction of the arrows as also indicated in Fig. 1.

Fig. 4 is a sectional plan view taken along the lines 4—4 of Fig. 1;

Fig. 5 shows the register of the scale mounted in a manner different from the mounting as shown in Fig. 1.

Fig. 6 is a front elevation of the register as shown in Fig. 5, with certain of the portions broken away to disclose construction lying to the rear thereof;

Fig. 7 is a side view of the parts as shown in Fig. 6;

Fig. 8 is a fragmentary partly sectional view showing certain details of the pointer mounting;

Fig. 9 is a sectional view taken along the lines 9—9 and in the direction of the arrows as indicated in Fig. 8.

Fig. 10 is a partly sectional elevation taken along the lines 10—10, and in the direction of the arrows as also indicated in Fig. 8.

Fig. 11 is a fragmentary sectional view of a coupling structure, and

Fig. 12 is a fragmentary perspective view showing a beam end and the method in which the same may be coupled to the register.

Referring primarily to Figs. 1 to 4, it will be noted that the numeral 15 indicates the standard of a scale of the platform type, and which supports a rocking beam 16 above which—in accordance with the usual practice—the standard mounts a support or shelf 17. In accordance with conventional structure, a poise 17' is mounted for sliding movement along the beam 16, and the latter may support adjacent its outer end a loop 18 from which a counter-poise supporting hook 19 is suspended.

A scale of this type is well known to those skilled in the art, and it is to be appreciated that the beam 16, as shown, has its face graduated or subdivided, and is connected to a rod 20, which is in turn coupled to the platform-supporting beams, (not shown). The operator places the object to be weighed upon the platform. Thereafter he associates with the hook 19, a weight having a value equal to the general weight value of the article upon the platform. Subsequently and by causing the poise 17' to transverse the beam, an exact weight-value indication is arrived at, by the beam swinging and coming to rest in a position which indicates that an even balance has been reached.

By means of the present invention an operator will only have to shift the poise 17' to a position approximating the true weight value of the article. Despite this, however, the operator will be entirely cognizant of such weight value; and moreover, by means of the present invention the scale beam, instead of oscillating for an interminable period, will quickly assume a position of rest.

Thus there is secured to the support 17 in a manner hereinafter brought out, a casing 21, which, adjacent its upper end is formed with sight openings 22.

Displayed in line with these openings is a chart 23 which may have upon its face suitable graduations. This chart is traversed by a pointer 24 which is connected at its lower end to the upwardly extending arm 25 of a hub member. This hub member, as shown in Figs. 8 and 9 may include a pair of plates 26 connected by cross bars 27 adjacent their upper and lower edges. The plates have aligned central openings within which blocks 28 of bearing material are inset. These blocks may be protected by covers 29 and are each formed with openings to receive the reduced ends of a shaft 30. The central portion of this shaft rests within a notch 31 formed in a bracket 32, secured to the inner face of the casing. Movement of this shaft, with respect to the bracket, may be prevented by a clamping plate 34 bearing against such shaft. Thus it will be seen that the pointer 24 is rotatably supported within the casing so that its end may freely traverse the chart 23.

In order to assure the normal maintenance of the pointer in a position centrally between the ends of the chart, a resilient element is employed. This element will additionally provide a factor which will increasingly resist movement of the pointer away from its neutral position. According to the preferred embodiment of this invention, this construction takes the form of a flexion strip 35 having its upper end secured to the lower cross bar 27, its lower end being pivotally secured to one end of a link 36, the opposite end of which is pivotally connected to the casing. As a consequence of this strip, the desired results are achieved.

Now with a view to preventing unnecessary movement on the part of the pointer and apparatus connected therewith, a dashpot 37 is mounted upon the inner face of the casing, as for example by means of a bracket 38, which is susceptible to being adjusted with respect to the casing. The dash-pot may be provided with an adjusting or regulating member 39, access to which may be had through an opening 40 formed through the wall of the casing. The dash-pot stem or rod 41 terminates in a preferably forked portion 42 which may be pivotally connected to the reduced end 43 of a rod 44. Extending from one of the plates 26 is an arm terminating in a forked portion 45. The gap of this forked portion is sufficient to accommodate the reduced end of the rod 44, and this arm is pivotally connected to the rod as is also the dash-pot plunger 41. As a consequence of this structure it will be understood that reciprocation of the rod 44 will cause oscillation on the part of the pointer 24, and that the movements of the rod will be dampened by the dash-pot.

In order to couple the actuating rod 44 to the beam 16, a block 46 is employed, which block has an opening for the accommodation of the lower end of the actuating rod, which latter may be clamped against movement with respect to the block, as for example by a set-screw 47. The block is formed with a further bore accommodating the rod 49, and this latter bore is flared towards the outer side faces of the block so as to furnish a fulcrum portion 48. Thus, the rod 49 may be extended through the bore, and such rod will be engaged by the central edge or fulcrum portion thereof, so that—within limits—the parts will be free to oscillate with respect to each other. To prevent shifting of the block 46 along the rod 49, stop members 50 may be clamped to the latter at points slightly spaced from the side faces of the block.

The rod 49 may be connected to the beam 16 by boring the latter to permit of the passage of this rod and then clamping these parts against movement with respect to each other. Such clamping, as illustrated in Figs. 5 and 12, may take the form of threading the inner part of rod 49 and mounting nuts 51 upon such rod, these clamping elements extending in contact with the opposite side faces of beam 16, or else bearing against washers 52, which directly engage such beam faces.

If it is not desired to bore the beam 16, attachment of the rod 49 thereto may be effected by employing a pair of straps 53 extending in contact with opposite faces of the beam and maintained in position adjacent one of their ends by a bolt and nut assembly 54. The inner end of rod 49 may be threaded and extend through openings adjacent the opposite ends of the straps to secure the latter against displacement. As shown especially in Fig. 1, the straps may be slotted so that the bolt 54 may be shifted to bear against one edge of the beam 16, while the rod 49 bears against the opposite edge of the same. In this manner the parts will be secured against danger of accidental displacement, and it will be obvious that as the beam oscillates, the rod 49 will move correspondingly to shift the rod 46.

In certain instances it may be desired to position the casing 21 so that an operator standing before the beam 16 can accurately determine the position of the pointer 24. With this in mind, the casing is formed with a ledge 55 through which bolts 56 may extend. There is also provided a pair of plates 57, coupled by bolts which may be extended to each side of the support 17. This construction has been shown in Figs. 1 to 4, in which it will also be noted that one of the plates 57 has an extension 58 upon which may be supported the ledge 55, the parts being maintained in position by the bolts 56. Additionally as shown, the slots in the plates 57, and which accommodate the bolts for clamping such plates, may be of sufficient length to allow for extreme variation in width on the part of the support 17. In other instances it may be desired to have the casing extend transversely of the beam 16. This is easily accomplished by having the rod 49 bent so that it extends in the form of a right angle and parallel to the beam body. The casing 21 is shifted so that its ledge 55 is mounted directly upon the upper plate 57, and the extension 58 of the latter may be conveniently dispensed with. Thus, the plates 57 will lie adjacent the end of support 17 in the manner indicated in Figs. 5, 6 and 7. However, the rod 49 will still connect the parts.

This form of mounting is preferable when an operator has to determine the weight value of a number of articles, each having substantially the same weight, but which are liable to vary to a minor extent. In that case, and if necessary, a counter-weight or weights will be associated with the support 19. Thereafter, the poise 17' will be moved to its proper position. An operator may now pass the successive articles to and remove them from the platform, and by simply observing the position of the pointer 24 with respect to the chart, determine the over or under weight characteristics of each article.

As will also be observed, it is preferred that the connection with the beam be made adjacent the outer end of the latter, and that this point of connection is preferably shielded by a casing or plate 59 which is secured to the casing 21. Regardless of the manner in which the latter casing is mounted upon the support 17 or its equivalent, it will be observed that the amount of deflection of the beam 16 from its evenly balanced condition will be accurately registered by the pointer 24, and that the weight value of such deflection may also be readily determined. Additionally, the action of the beam 16 will be dampened so that it will quickly assume a condition of rest. Finally, it will be noted that a relatively unskilled person may mount the attachment upon the scale, it being, of course, understood that the apparatus might be initially provided as a part of the scale at the time of manufacture of the latter.

Obviously, numerous changes in the construction and rearrangement of the parts might be resorted to without departing from the spirit of the invention as defined by the claims.

Having thus described the invention, what is claimed is:

1. In a scale, a pointer, a pair of plates connected to each other and to said pointer, means for rotating said plates, means for resisting such rotation, a mounting member, a shaft secured to said mounting member, blocks of material carried by said plates, and the ends of said shaft extending into said blocks and having rotatable engagement therewith.

2. In a scale, a registering mechanism, a rod extending from said mechanism to actuate the same, a second rod to be connected to the beam of the scale, means for connecting said rods, said means including a block formed with a bore presenting fulcrum edges and through which bore one of such rods extends, and stop members associated with said rod to limit the movements of said block with respect thereto.

3. In a scale, a registering mechanism, a rod extending from said mechanism to actuate the same, a second rod to be connected to the beam of a scale, means for connecting said rods, said means including a block formed with a bore presenting fulcrum edges and through which bore one of such rods extends, and said block being formed with a further bore for the accommodation of said second rod.

4. In a scale, a registering mechanism, a rod extending from said mechanism to actuate the same, a second rod to be connected to the beam of a scale and means for connecting said rods, said means including a block formed with a bore presenting fulcrum edges and through which bore one of such rods extends, said block being formed with a further bore for the accommodation of said second rod, and means for preventing movement of said latter rod with respect to said block.

J. E. WOODLAND.
PAUL J. KIRCHER.